Sept. 14, 1937.   G. SEBRING   2,093,370
FILTER
Filed May 27, 1936
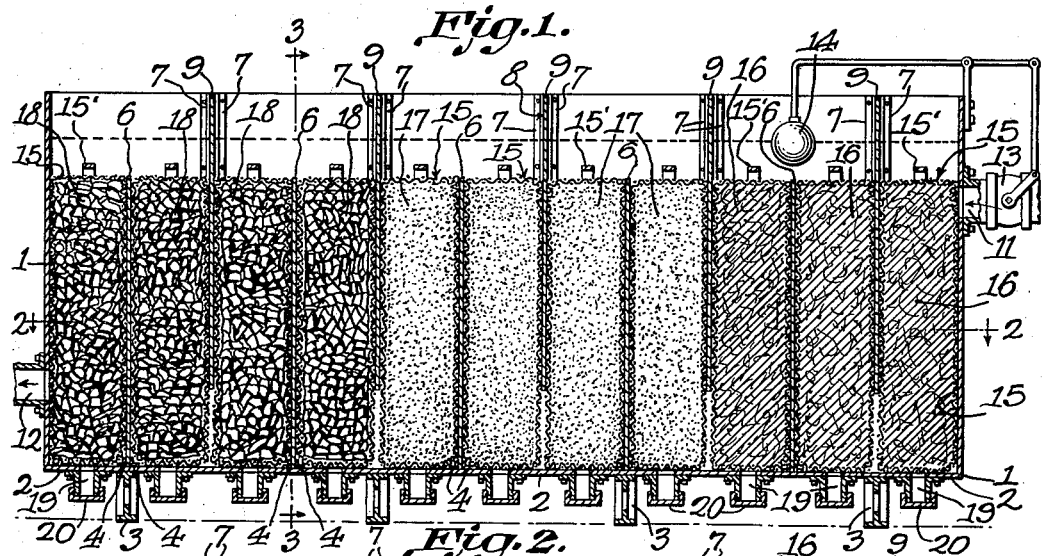
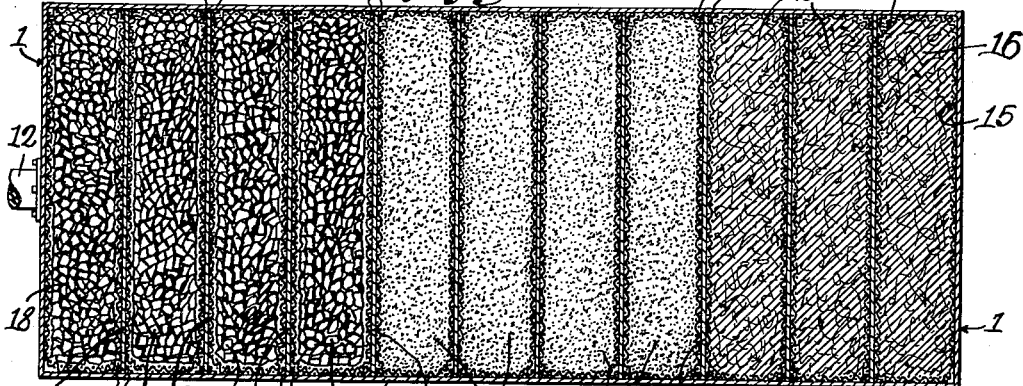
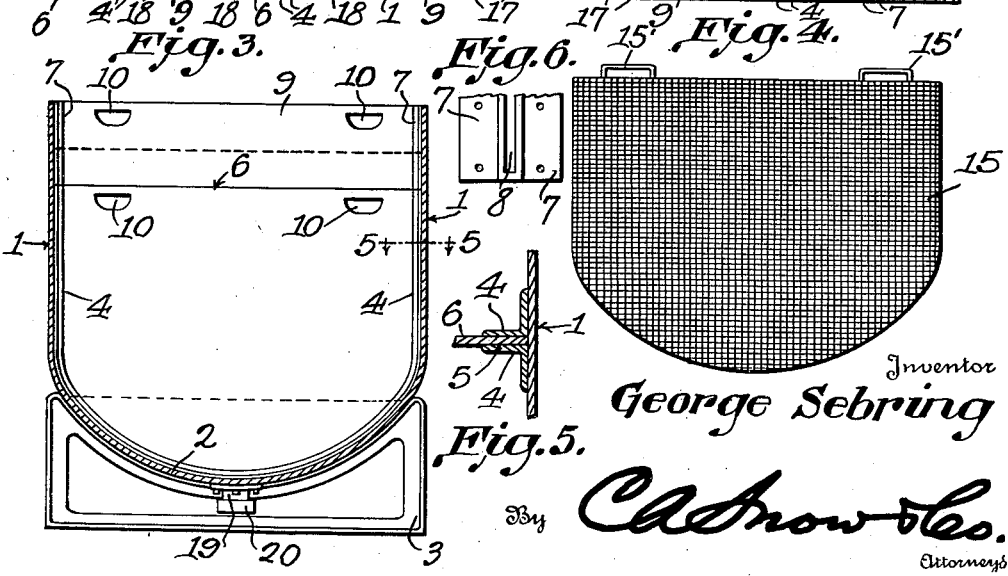
Inventor
George Sebring Patented Sept. 14, 1937

2,093,370

UNITED STATES PATENT OFFICE 2,093,370

FILTER

George Sebring, Los Angeles, Calif.

Application May 27, 1936, Serial No. 82,130

2 Claims. (Cl. 210—126)

This invention relates to a filter for removing impurities from water prior to its use in boilers, cooling systems, and wherever impure water tends to form incrustations on the surfaces with which it comes in contact.

An object of the invention is to provide a filter through which the water will flow upwardly and downwardly along a tortuous path at which time it will pass successively through different kinds of filtering material which will remove the impurities and allow the water to flow from the filter in a clear, substantially pure condition.

A further object is to provide a filter which can be cleaned easily.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a vertical longitudinal section through the filter.

Figure 2 is a section on line 2—2, Figure 1.

Figure 3 is a section on line 3—3, Figure 1.

Figure 4 is an elevation of one of the removable baskets.

Figure 5 is an enlarged section through a portion of the body and one of the partitions, said section being on the line 5—5, Figure 3.

Figure 6 is an elevation of the closed lower end portion of one of the channels.

Referring to the figures by characters of reference 1 designates the body of the filter which can be of any desired shape and size. In the present instance it is in the form of a deep trough having a concave bottom 2 resting on suitable supports 3. The top of the body is shown open although it is to be understood that the same can be provided with a movable cover if so desired.

Secured to the inner surfaces of the sides of the body are parallel angle strips 4 arranged in pairs and spaced apart to form narrow channels 5 between them. These strips are continued along the bottom of the body so that the channels 5 thus extend downwardly along the sides and across the bottom. Each of the channels provides a seat for a transverse partition 6 removably mounted in the body and fitting snugly against the sides and bottom thereof. These partitions do not extend to the top of the body but terminate therebelow as clearly indicated in Figures 1 and 3.

Located on the inner surfaces of the sides of the body between and at equal distances from the partitions 6 are pairs of angle strips 7 forming channels 8 therebetween. These strips and the channels extend from the top of the body to points above and spaced from the bottom. At these lower points the channels are closed so as to support partition plates 9 seated in the channels and extending to the top of the body.

All of the partitions 6 and 9 are formed with handle portions 10 whereby they can readily be pulled upwardly out of position between their angle strips and easily replaced. When all of the partition plates are in position they form in the body 1 a tortuous passage extending from an inlet 11 in one end of the body to an outlet 12 in the other end. This passage extends downwardly under each of the partitions 9 and upwardly over each of the partitions 6. The supply of water to the inlet can be controlled by a valve 13 to which is connected a float 14 in the upper portion of the body. Thus should the water in the filter reach too high a level, the float would rise and cut down or shut off the flow to the inlet.

Removably seated between all of the partitions are foraminous baskets 15 formed of metal fabric or of perforated metal. These baskets lie close to the side walls and bottom of the body and to the partitions. They are formed with handles 15' or the like whereby they can be raised from or lowered into the body without difficulty. The several baskets are designed to hold the filtering material that is used. In the structure illustrated three kinds of material are employed. The material contained in the three baskets nearest the inlet are filled with a coarse filtering material such as straw or coke, this material being indicated at 16. The next four succeeding baskets are filled with sand or coarse gravel indicated at 17 while the remaining baskets nearest the outlet are filled with charcoal indicated at 18. It is to be understood of course that the filtering materials used in the various baskets can be changed to meet the requirements. To facilitate precipitation of foreign matter plates connected to the terminals of an electric circuit can be suspended in the water at any point desired to effect separation by electrolysis.

Formed along the lowest portion of the bottom 2 of the body are outlets 19 one of which is positioned under each basket. These outlets are normally closed in any suitable manner, as by means of caps 20, and constitute means whereby sediment may be drained from the filter.

In practice the water to be filtered is first heated to a temperature of from 165° F. to 200° F. It is also preferably mixed with a chemical serving to quickly precipitate solids. The water is then admitted to the filter through inlet 11 where it will flow downwardly through the first basket, under the first partition 9, upwardly through the second basket, and over the first partition 6 to the third basket through which it will flow downwardly. As these baskets are filled with coarse filtering material 16, the coarser solids will be retained and ultimately precipitated to the bottom 2. The water next follows a tortuous path through the sand filled baskets 15 where further separation is effected, the finer impurities being removed. Finally the water will be treated and further purified by flowing through the charcoal or other material in those baskets nearest the outlet. Thus the water, when delivered, will be substantially pure.

From time to time, as found necessary, the partitions 6 and 9 can be withdrawn so that the baskets which are fitted snugly between them are thus released for ready withdrawal. The contents of the baskets can then be cleaned or replaced and by opening the outlets 19, the interior surfaces of the body 1 can be scoured and all sediment drained from the filter. The outlets can be closed, the cleaned partitions reinserted, and the baskets lowered into positions between the partitions where they will be ready to again filter the water.

What is claimed is:

1. A filter including a body open at the top and having guides along the side portions thereof, partitions mounted within the guides and slidable therein, alternate partitions being spaced normally from the bottom of the filter and the remaining partitions, normally resting on the bottom and spaced from the top of the body, thereby to provide a tortuous passage between the partitions, foraminous baskets removably mounted between the partitions and containing filtering material, said baskets being fitted snugly upon the bottom of the body and against adjacent partitions to bind upon the partitions and hold them against free movement in their guides, said partitions being bodily removable forcibly to release the baskets for removal, there being a water containing space between the tops of the baskets and the top of the body, an inlet member opening into the body at one end of the tortuous passage, a valve, and a valve controlling float in the water receiving space above the baskets, there being an outlet at the other end of the tortuous passage.

2. A filter including a body open at the top and having normally closed drain outlets in the bottom thereof, the bottom of said body being inclined downwardly toward the outlet, guiding and supporting means upon the walls and bottom of the body, partitions supported and guided by said means between the drain outlets and alternately spaced from the top and bottom respectively of the body to form a tortuous passage extending under and over successive partitions from the inlet to the outlet, there being a water containing space above all of the passages and divided by alternate partitions when positioned upwardly from the bottom of the body, foraminous baskets of filtering material within the body and between the partitions, said baskets being fitted snugly against said partitions and to grip and hold them against free movement and being seated upon the bottom of the body, said partitions being forcibly removable from the body to release the baskets for convenient withdrawal from the body, a float in the water containing space above the passages, and a valve in the inlet controlled by the float.

GEORGE SEBRING.